Figure 1:
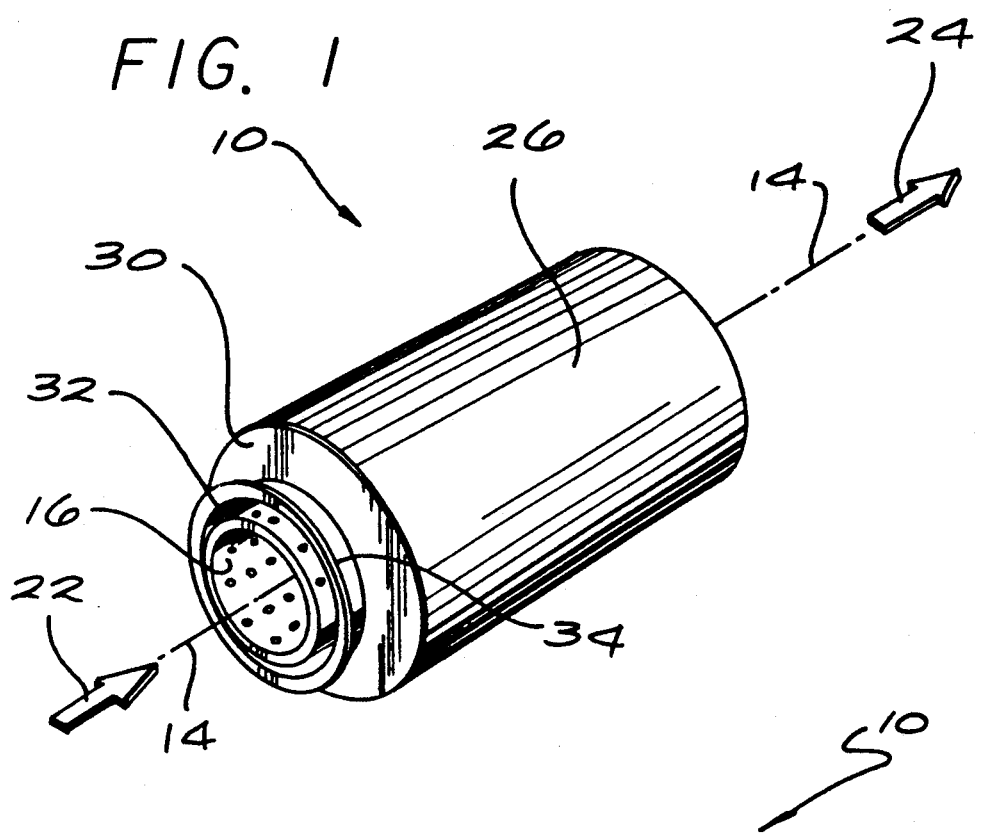

United States Patent [19]
Ross et al.

[11] Patent Number: 5,162,620
[45] Date of Patent: Nov. 10, 1992

[54] DUAL FLOW TURBINE ENGINE MUFFLER

[75] Inventors: David F. Ross, Scottsdale; Charles M. Royalty, Tempe, both of Ariz.

[73] Assignee: Allied-Signal Inc., Morris Township, Morris County, N.J.

[21] Appl. No.: 442,378

[22] Filed: Nov. 28, 1989

[51] Int. Cl.$^5$ ............................ F01N 1/02; F01N 1/14
[52] U.S. Cl. .................... 181/220; 181/250; 181/262
[58] Field of Search ................ 181/248–250, 181/231, 243, 252, 256, 220, 259, 262, 263, 266, 276; 239/265.11, 265.13, 265.17; 60/262, 264, 317

[56] References Cited

U.S. PATENT DOCUMENTS

| | | | |
|---|---|---|---|
| 1,975,861 | 10/1934 | Oldberg | 181/250 |
| 2,988,302 | 6/1961 | Smith | 181/220 X |
| 3,463,402 | 8/1969 | Langston, Jr. | 239/265.13 |
| 3,572,464 | 3/1971 | Macdonald | 181/215 |
| 3,685,614 | 8/1972 | Coanda et al. | 60/317 X |
| 3,711,013 | 1/1973 | Tontini et al. | 239/265.17 |
| 3,726,091 | 4/1973 | Tontini | 60/264 |
| 3,739,984 | 6/1973 | Tontini | 239/265.17 |
| 3,749,316 | 7/1973 | Tontini | 239/265.13 |
| 4,128,769 | 12/1978 | Bons et al. | 181/220 X |
| 4,240,252 | 12/1980 | Sargisson et al. | 60/262 |
| 4,747,467 | 5/1988 | Lyon et al. | 181/222 X |

Primary Examiner—Benjamin R. Fuller
Assistant Examiner—Nancy Le
Attorney, Agent, or Firm—Terry L. Miller; Jerry J. Holden; Robert A. Walsh

[57] ABSTRACT

An elongate exhaust gas muffler for a turbine engine includes a foraminous central exhaust duct which is circumscribed along its length by a plurality of tuned dissipative and reactive noise attenuation chambers. At an inlet end of the muffler an annular secondary flow inlet is defined about the central exhaust duct and opens to the first sound attenuation chamber. A secondary flow of pressurized bleed air is receivable into the first attentuation treatment in the muffler.

23 Claims, 2 Drawing Sheets

DUAL FLOW TURBINE ENGINE MUFFLER

The present invention relates generally to turbine engine exhaust gas mufflers, and more particularly, provides a uniquely configured exhaust gas muffler, and associated noise attenuation methods, for effectively attenuating both the noise of the engine exhaust gas flow and noise resulting from a bleed flow of pressurized air.

In many gas turbine engine applications, particularly those in which the engine is used in conjunction with a commercial passenger aircraft, effective attenuation of the engine exhaust gas noise is very important. Particularly at ground service stations for the aircraft, whereat ground crew load and unload luggage, fuel and provision the aircraft, and remove waste materials from the aircraft, stringent noise level limits must be observed. Under these ground service conditions, the propulsion engines of the aircraft are shut down, and the turbine engine of interest is that of the aircraft auxiliary power unit (APU). This APU turbine engine is generally located in the aircraft tail structure, and is operated to provide electrical and pressurized air power to the aircraft. The pressurized air is used typically to power air cycle environmental control units (ECU's) which heat or cool the aircraft passenger and crew cabins.

In general, to satisfactorily diminish the exhaust noise of an APU turbine engine, both its core and turbine noise must be attenuated. Core noise is a low frequency noise component believed to be at least partly caused by the combustion process within the engine. On the other hand, turbine noise is a high frequency noise component caused by the interaction of high velocity gasses with the engine's turbine section. The frequency spectrum of core noise is essentially broad band, peaking at relatively low frequency around 200 to 800HZ where most of the sound energy is concentrated. Turbine noise, in contrast, is a significantly higher frequency noise phenomenon, having both broad band and discrete spectral components. The turbine noise component generally peaks above 10,000HZ.

To effect a satisfactory degree of silencing of both core and turbine noise components of APU turbine engine exhaust flow, conventional mufflers have evolved into relatively large and heavy structures. Sometimes these conventional mufflers approach the overall size of the engine they serve.

In addition, many APU installations provide a bleed air flow or load compressor air flow which at times significantly exceeds the needs of the aircraft. Under such conditions, a bleed flow venting valve is opened to release the excess flow of pressurized air to ambient. This venting of pressurized air can add a significant additional increment of noise from the engine. In fact, this venting noise can be expected to dominate the engine exhaust noise at high frequencies, i.e., above 2000HZ. In order to attenuate this air venting noise, conventional APU turbine engine installations have provided a separate muffler structure for the vent flow. Of course, this additional vent flow muffler adds to the size, weight and cost of the APU turbine engine installation. An alternative expedient to the separate bleed flow muffler is to simply duct the bleed air flow into the inlet of the APU turbine engine muffler and hope that the muffler will attenuate the engine and bleed air flow noise together sufficiently to meet noise emission standards. This simple expedient has not met with success. Conventional APU turbine engine mufflers have been found not to attenuate the bleed air flow noise sufficiently.

Thus, it is an objective for this invention to provide a dual flow turbine engine muffler for receiving and attenuating the noise of both the engine exhaust gas flow and a bleed flow of pressurized air.

The present invention provides a dual flow muffler for attenuating turbine engine noise, said muffler comprising: an exhaust duct extending axially through said muffler and defining an inlet and an outlet for respectively receiving and discharging turbine engine exhaust gasses, an axial array of tuned resonant noise attenuation cavities disposed about said exhaust duct and communicating therewith through a foraminous exhaust duct wall, said muffler defining a secondary inlet opening to at least one of said tuned resonant noise attenuating cavities for receiving a flow of pressurized air to be vented to ambient along with said exhaust gasses, and said foraminous exhaust duct wall including a portion communicating said at least one resonant cavity with said exhaust duct which portion readily permits dispersed quieting flow of said venting pressurized air into said exhaust duct while effecting reactive attenuation of noise from said exhaust gasses.

In a preferred embodiment of the invention, the exhaust duct passes through a plurality of resonant reactive sound attenuation chambers each communicating with the duct through a formaminous duct wall. The first of these chambers closest to the inlet, communicates with the exhaust duct through a portion of the duct wall which is perforate, and which offers a significantly lower resistance to air flow therethrough than does the remainder of the foraminous duct wall. This first chamber also receives the bleed flow of pressurized air through the second inlet. Thus, the first chamber truly serves a dual function as a resonant noise attenuator with respect to engine exhaust gasses, and as a distribution and silencing chamber for the bleed air flow. Advantageously, the perforate wall portion forces a serpentine flow direction change for the bleed air flow, which is thought to assist in attenuating noise from this bleed air flow.

Figure 2:
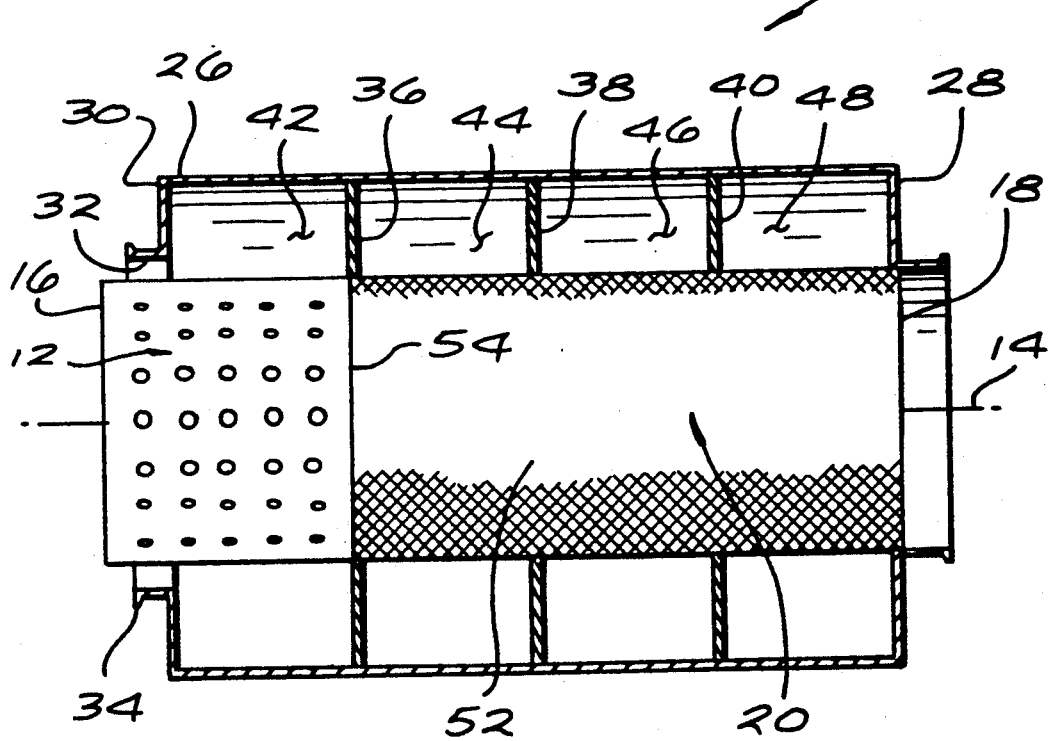
Figure 3:
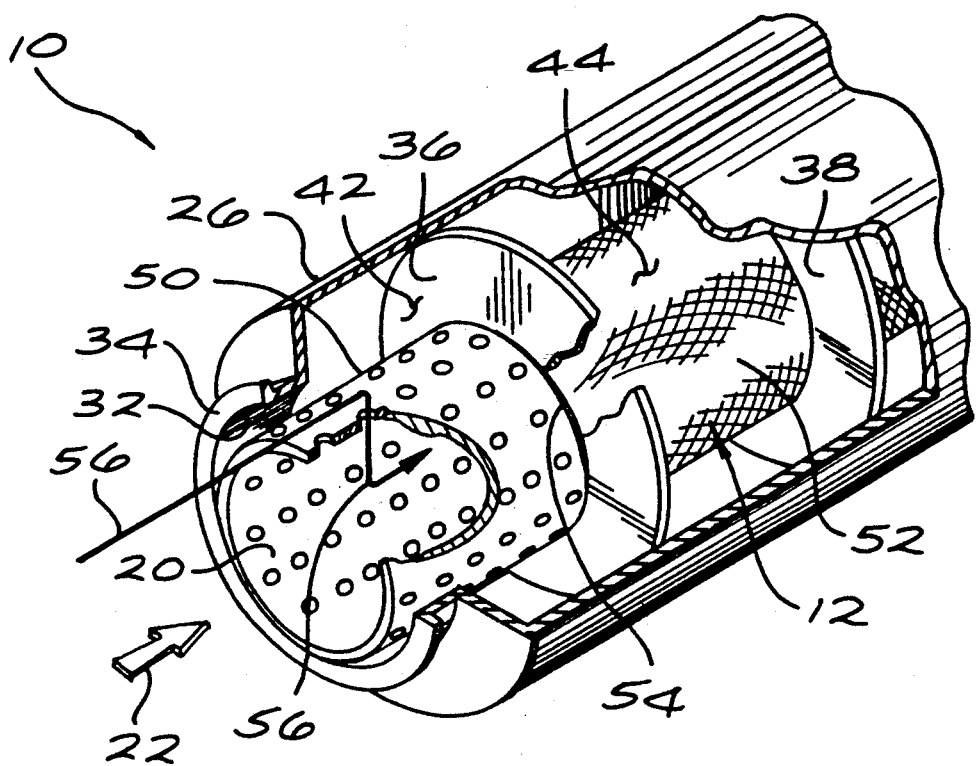

FIG. 1 is a perspective view of a dual flow muffler embodying principles of the present invention;

FIG. 2 provides a longitudinal cross sectional view generally along line 2—2 of FIG. 1, and at an enlarged size: and FIG. 3 depicts a fragmentary perspective view similar to FIG. 1, but at an enlarged size and with portions broken away to better illustrate internal structure of the muffler.

Illustrated in FIGS. 1-3 is a dual flow muffler 10 particularly for use with a turbine engine (not shown). The muffler 10 is adapted to attenuate noise both of the turbine engine exhaust gasses, and of a bleed flow of pressurized air venting to ambient. It will be understood that the term "bleed flow" is employed in connection with the venting of pressurized air regardless of whether this air is truly bled from the turbine engine, or originates with a load compressor driven by the turbine engine. The essence of the term "bleed flow of pressurized air" is to denote venting pressurized air in excess of that required by the turbine engine and air consuming devices served by the turbine engine, as installed.

The muffler 10 includes an open-ended axially extending duct 12 which circumscribes a flow axis, referenced with the numeral 14. Duct 12 has an inlet 16, an outlet 18, and an elongate circumferential foraminous duct wall 20. A flow of noise laden turbine engine exhaust gasses are introduced to the duct 12 through inlet 16, as depicted by arrow 22. This exhaust gas is discharged in a much-quieted condition from outlet 18, as represented by arrow 24.

Circumscribing the duct wall 20 in a radially outwardly spaced relation therewith is an outer casing wall 26. The casing wall 26 is joined with duct wall 20 by an annular end wall 28 adjacent outlet 18. At the inlet end of duct 12, an annular end wall 30 extends radially inwardly from casing wall 26 toward, but short of, the duct wall 20. The end wall 30 cooperates with duct wall 20 to define an annular secondary inlet 32 circumscribing inlet 16, and at a radially inner extent thereof carries an axially extending collar 34 by which the muffler 10 may be sealingly secured to a turbine engine (not shown). Spaced axially between the end walls 28, and 30, is a plurality of annular baffle walls 36, 38, and 40. The baffle walls 36-40 secure both to duct wall 20 and to casing wall 26, at their respective inner and outer radial margins. Thus, the radial walls 28, 30, and 36-40, cooperate with duct wall 20 and casing wall 26 to bound a plurality of axially successive cavities 42-48. The secondary inlet 32 opens to the first of these cavities (cavity 42) adjacent inlet 16.

Viewing now particularly FIG. 3, it will be seen that the foraminous duct wall 20 includes a first perforate portion 50 and an axially adjacent non-woven or felted fibrous metallic gas-permeable portion 52. Portion 50 extends from inlet 16 throughout the first cavity 42, while portion 52 extends through the remaining cavities 44-48 to the outlet 18. The portions 50 and 52 are joined to one another at a joining line 54, and baffle wall 36 secures to duct wall 20 proximate to the joining line 54. While each of the portions 50 and 52 of duct wall 20 are gas-permeable, the perforate portion 50 has a considerably lower resistance to the flow of gas therethrough then does the felted metallic wall portion 52.

With respect to attenuation of noise introduced into the duct 12 with the exhaust flow 22, each of the cavities 42-48 may be considered a tuned resonent attenuation chamber. However, it is easily appreciated that the dissipative energy attenuation achieved at chambers 44-48 is superior to that achieved at chamber 42 because of the greater flow resistance and sound energy absorption capacity of the felted metallic wall portion 52. The wall portion 52 preferably has a flow resistance in the range of 30-150 cgs rayls. Nevertheless, the resonant cavity 42 is believed to make a significant contribution to the overall exhaust noise attenuation achieved by the muffler 10 due to its reactive energy attenuation.

Also received into the muffler 10 via secondary inlet 32 is a flow of pressurized bleed air, represented by arrow 56. The air 56 is to be vented to ambient because it is in excess of the needs of the turbine engine, and of the aircraft associated with the turbine engine. The air flow 56 enters secondary inlet 32 axially with respect to the muffler 10 to distribute axially within chamber 42. As depicted, the airflow 56 must turn 90° to then flow radially inwardly through the multiple dispersing perforations of the perforate wall portion 50 into the duct 12. Once in the duct 12, the air flow 56 must again turn 90° to flow downstream along with the exhaust gasses 22.

Figure 4:
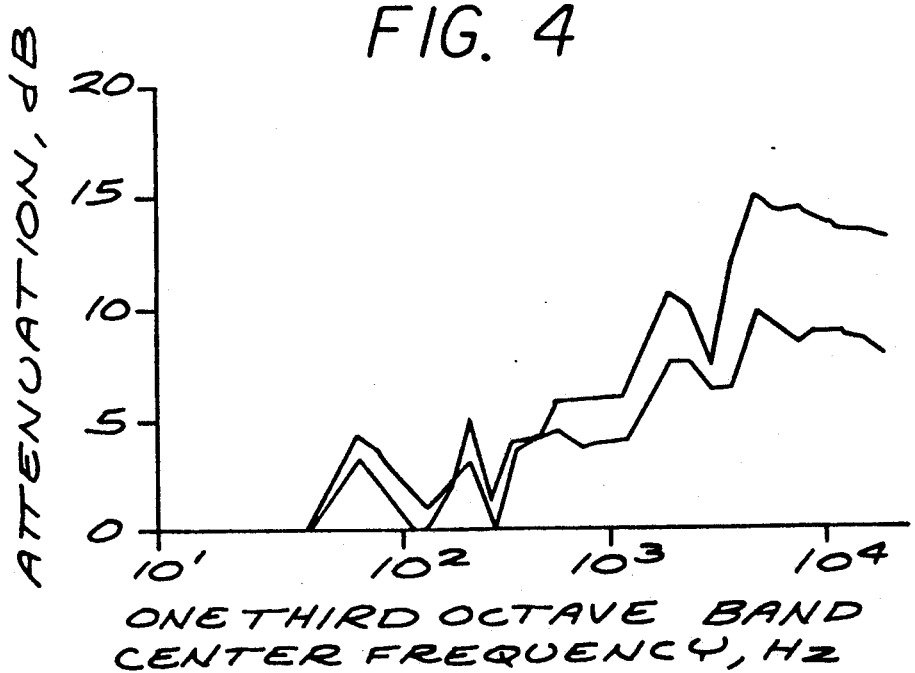

The applicants have built and tested a muffler according to the preferred embodiment of the invention depicted herein. FIG. 4 presents a graph of acoustical performance of an industry-standard, or conventional, muffler in comparison with an inventive muffler. The reference (i.e., zero attenuation) was established by operating an APU turbine engine with hard-wall exhaust duct equal in length to the conventional and inventive mufflers. During these tests, a bleed flow of pressurized air was vented to ambient through the exhaust gas flow path of the combined engine and muffler or hard-wall duct. As represented by the lower data trace line on FIG. 4, the conventional muffler achieved a maximum attenuation of about 10DB at 5000HZ. In contrast, the inventive dual flow muffler achieved a significantly better peak attenuation of almost 15DB at 5000HZ, as is represented by the upper test data trace on the graph of FIG. 4.

What is claimed is:

1. A dual flow muffler for attenuating turbine engine noise, said muffler comprising:
   an exhaust duct extending axially through said muffler and defined by a foraminous duct wall having an inlet and an outlet for respectively receiving and discharging turbine engine exhaust gasses;
   a casing circumscribing said duct wall; a plurality of annular baffle walls disposed between said foraminous duct wall and said casing, said annular baffle walls axially spaced apart to define an axial array of tuned resonant noise attenuation cavities disposed about said foraminous duct wall;
   said casing defining a secondary inlet to said muffler, said secondary inlet opening into at least one of said tuned resonant noise attenuating cavities for receiving a flow of pressurized air; and
   said foraminous duct wall including a first portion communicating said at least one of said resonant cavities with said exhaust duct, and dispersing said pressurized air into said exhaust duct while effecting reactive attenuation of noise from said exhaust gasses.

2. The invention of claim 1 wherein said foraminous duct wall includes said first portion and a remainder portion having a higher resistance to air flow therethrough than said first portion.

3. The invention of claim 2 wherein said first portion is of perforate sheet metal material.

4. The invention of claim 3 wherein said remainder portion is of felted fiberous metallic sheet material.

5. The invention of claim 4 wherein said first portion and said remainder portion abut one another axially to cooperatively define a joining line circumscribing said exhaust duct.

6. The invention of claim 5 wherein one of said baffle walls is disposed proximate said joining line, said one of said baffle walls bounding said at least one of said resonant cavities.

7. The invention of claim 6 wherein said at least one resonant cavity is disposed axially adjacent to said inlet and is first traversed by turbine engine exhaust gasses flowing in said exhaust duct.

8. The invention of claim 7 wherein said casing includes an inlet end wall extending radially inwardly toward but short of said duct wall to cooperatively define therewith said secondary inlet of annular configuration circumscribing said duct wall, said inlet end wall inwardly bounding said at least one of said resonant cavities and outwardly carrying an axially extending collar surrounding said secondary inlet for sealingly securing said muffler to a turbine engine.

9. Dual flow muffler apparatus for attenuating noise carried both by a flow of exhaust gasses from a turbine engine and a venting flow of pressurized air provided by said engine; said muffler apparatus comprising:

an elongate axially extending casing having an axially extending casing wall, an inlet end wall, and an outlet end wall, each said wall cooperatively defining an axially disposed casing inlet at one end of said muffler, an axially disposed casing outlet at the opposite end of said muffler, and a chamber within said muffler communicating said casing inlet with said casing outlet; and an elongate axially extending exhaust duct member having a foraminous duct wall disposed in said chamber and extending between said casing inlet and said casing outlet, said exhaust duct member dividing said chamber into a central portion surrounded by said foraminous duct wall and an annular resonant remainder portion circumscribing said foraminous duct wall, said exhaust duct member having an inlet, coextensive with said casing inlet, for receiving said flow of exhaust gasses and an outlet joining with said outlet end wall for discharging flow therein to ambient, said exhaust duct member and said inlet end wall cooperating in radially spaced relation to define at said casing inlet an annular secondary inlet to said remainder portion for receiving said venting flow of pressurized air, whereby said venting flow of pressurized air is communicated through said foraminous exhaust duct wall into said central portion and then to ambient through said exhaust duct member.

10. The invention of claim 9 wherein said muffler further includes an axially spaced plurality of baffle walls disposed in said chamber remainder portion about said exhaust duct, said plurality of baffle walls dividing said chamber remainder portion into a plurality of axially successive resonant chamber sub portions.

11. The invention of claim 10 wherein said secondary inlet communicates with the one of said plurality of resonant chamber sub portions which is disposed at said inlet end of said exhaust duct.

12. The invention of claim 11 wherein said foraminous duct wall includes a first portion radially congruent with said one resonant chamber sub portion, said first portion of said duct wall being formed of perforate sheet metal material.

13. The invention of claim 12 wherein the remainder of said foraminous duct wall is formed of felted fiberous metallic sheet material.

14. A method of attenuating noise associated with a flow of exhaust gasses from a turbine engine and a venting flow of pressurized air, said method comprising the steps of:

conducting said flow of gasses axially through an inner casing of a muffler structure having an outer casing circumscribing said inner casing and a plurality of wall members disposed between said inner and outer casings to define an axial succession of resonant noise attenuation chambers;

introducing said venting flow of pressurized air into one of said chambers;

flowing said venting pressurized air through a flow-dispersing multi-perforate wall portion of said inner casing into mixing relation with said flow of exhaust gasses; and flowing said mixture of gasses and air to ambient.

15. The method of claim 14 further including the steps of: utilizing the one of said axial succession of resonant noise attenuation chambers first encountered by said flow of exhaust gasses as a chamber into which said venting flow of pressurized air is introduced; and flowing said mixed exhaust gasses and venting flow of pressurized air together past the remainder of said axial succession of resonant noise attenuation chambers to ambient.

16. The method of claim 14 wherein step of introducing said venting flow of pressurized air into said one of said resonant noise attenuation chambers includes the step also of flowing said venting pressurized air axially in the direction of flow of said exhaust gasses.

17. The method of claim 16 wherein said step of flowing said venting pressurized air through a flow-dispersing multi-perforate wall into intermixing relation with said flow of exhaust gasses includes the steps of: turning said venting flow from an axial flow direction to a radially inward flow direction: dispersing said venting flow through the plural perforations of said multi-perforate wall in a radially inward flow direction, and intermixing said dispersed venting flow with said exhaust gasses while turning said venting flow to an axial direction for discharge to ambient.

18. A noise muffler, for a gas turbine engine expelling two streams of gasses both of which generate noise, comprising a housing having a first and second inlet and an outlet, said housing having an outer casing circumscribing an inner casing and a plurality of wall members disposed between said inner and outer casings to define a plurality of dead ended cavities dimensioned to attenuate said noise and arranged in series, a first flow path extending from said first inlet to said outlet and passing therebetween adjacent said series of cavities, and a second flow path extending from said second inlet to a portion of said first flow path downstream of said first inlet, and passing therebetween through one of said dead ended cavities, said first flow path receiving one of said gas streams and said second flow path receiving the other of said gas streams.

19. The noise muffler of claim 18 wherein said second flow path includes a bent of about 90 degrees within said one of said dead ended cavities.

20. The noise muffler of claim 19 wherein said inner casing is foraminous and is disposed between said first inlet with said outlet to define said first flow path.

21. The noise muffler of claim 20 wherein said one of said dead ended cavities is disposed nearer to said first inlet than to said outlet.

22. The noise muffler of claim 21 wherein said one of said dead ended cavities is nearest said first inlet.

23. The noise muffler of claim 20 wherein said first flow path passes in grazing contact with said foraminous casing, and said second flow path passes through a portion of said foraminous casing after passing through said bend.

* * * * *

UNITED STATES PATENT AND TRADEMARK OFFICE
CERTIFICATE OF CORRECTION

PATENT NO. : 5,162,620
DATED : NOVEMBER 10, 1992
INVENTOR(S) : DAVID F. ROSS ET AL

It is certified that error appears in the above-identified patent and that said Letters Patent is hereby corrected as shown below:

Column 4, line 54, please insert --of said-- between "one" and "resonant".

Column 4, line 55, please replace "cavity" with --cavities--.

Column 6, line 47, please replace "bent" with --bend--.

Signed and Sealed this

Twelfth Day of October, 1993

Attest:

BRUCE LEHMAN

*Attesting Officer*          *Commissioner of Patents and Trademarks*